(12) United States Patent
Dokas

(10) Patent No.: US 6,890,160 B2
(45) Date of Patent: May 10, 2005

(54) FUEL PUMP HAVING ELECTRICALLY BIASED SHELL

(75) Inventor: Dave Dokas, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 152 days.

(21) Appl. No.: 10/287,978

(22) Filed: Nov. 5, 2002

(65) Prior Publication Data

US 2004/0086403 A1 May 6, 2004

(51) Int. Cl.⁷ .................................................. F04B 17/03
(52) U.S. Cl. ..................... 417/423.3; 417/572; 417/313; 439/520; 439/519
(58) Field of Search ............................ 417/423.3, 572, 417/313; 439/520, 519

(56) References Cited

U.S. PATENT DOCUMENTS

| | | | |
|---|---|---|---|
| 4,093,529 A | | 6/1978 | Strobach |
| 4,694,211 A | * | 9/1987 | Bayha et al. .................. 310/71 |
| 4,855,029 A | | 8/1989 | Gazda et al. |
| 5,257,916 A | * | 11/1993 | Tuckey ..................... 417/423.3 |
| 5,283,494 A | | 2/1994 | Frank et al. |
| 5,393,206 A | * | 2/1995 | Roth et al. ................... 417/313 |
| 5,522,992 A | * | 6/1996 | Cervantes .................... 210/542 |
| 5,642,718 A | | 7/1997 | Nakai et al. |
| 5,762,481 A | * | 6/1998 | Oi ............................ 417/423.3 |
| 5,785,032 A | | 7/1998 | Yamashita et al. |
| 6,114,791 A | * | 9/2000 | Ito et al. ....................... 310/233 |
| 6,206,035 B1 | | 3/2001 | Wehner et al. |
| 6,216,671 B1 | | 4/2001 | Sawert et al. |
| 6,331,242 B1 | | 12/2001 | Horton |
| 6,423,208 B1 | | 7/2002 | Russell |
| 6,478,613 B1 | * | 11/2002 | Zoell et al. .................. 439/519 |
| 2002/0085930 A1 | * | 7/2002 | Hiraiwa et al. ............. 417/307 |

FOREIGN PATENT DOCUMENTS

| | | |
|---|---|---|
| DE | 3140946 A1 | 5/1983 |
| GB | 567579 | 2/1945 |
| JP | 3032340 | 2/1991 |

OTHER PUBLICATIONS

UK Search Report.

* cited by examiner

*Primary Examiner*—Justine R. Yu
*Assistant Examiner*—Emmanuel Sayoc
(74) *Attorney, Agent, or Firm*—Brinks Hofer Gilson & Lione

(57) ABSTRACT

A fuel pump is provided that is submersible within a fuel, for example, within a fuel tank of an automotive vehicle and is particularly suited for use with high alcohol content fuels that tend to contain ionic species. The fuel pump comprises an electric motor that includes a commutator and a negative brush electrode that is connected to a negative terminal of an external power supply. The electric motor is at least partially disposed within a metal shell that is in contact with the fuel. The metal shell is also connected to the negative terminal of the external power supply. During operation, a negative electrical potential is applied to the metal shell to preferentially react with ions within the fuel. In this manner, the metal shell serves as a anode to reduce the concentration of ionic species in the fuel, thereby decreasing reactions with the brush electrode and extending the useful life of the fuel pump.

21 Claims, 1 Drawing Sheet

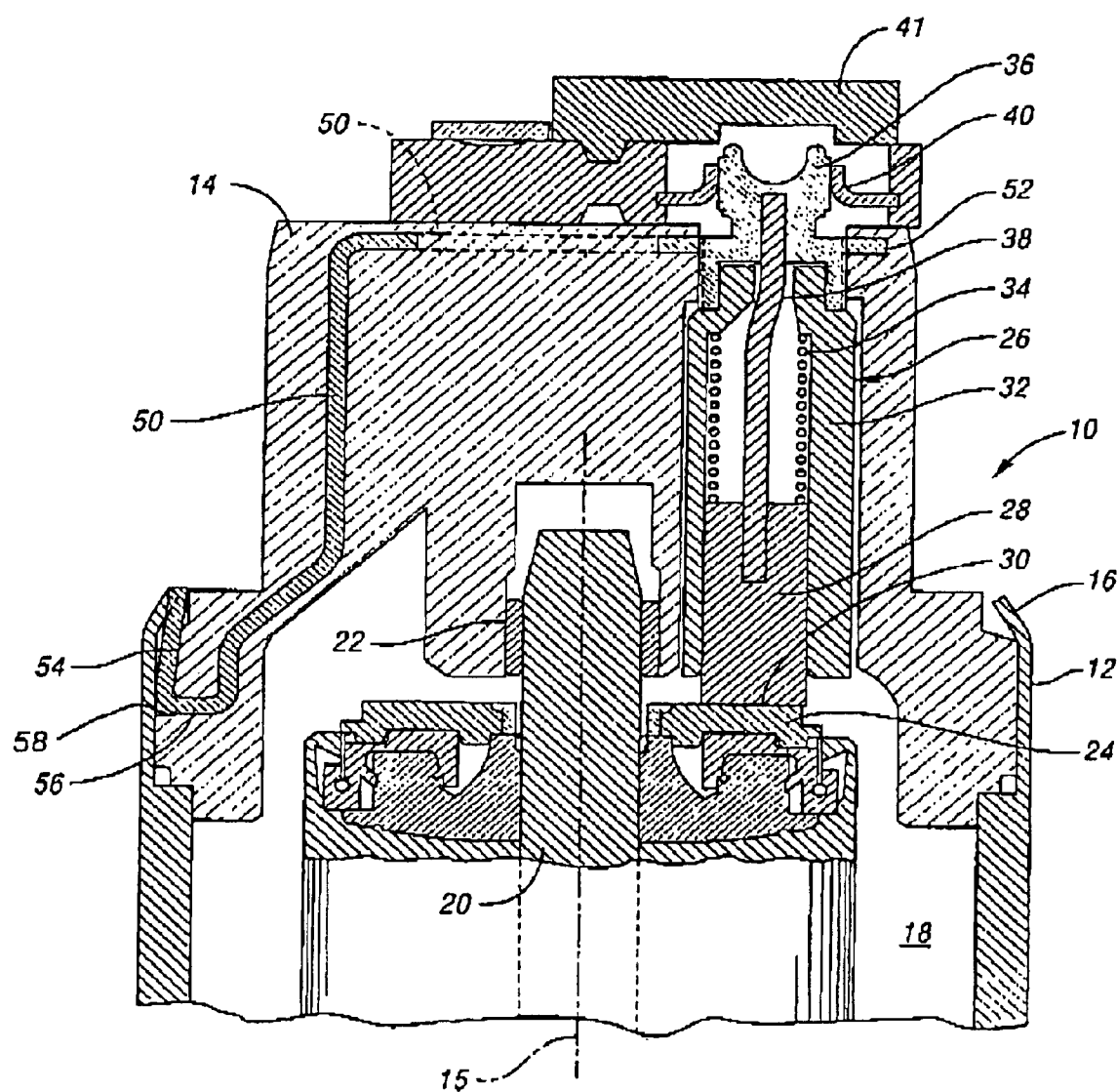
Figure

FUEL PUMP HAVING ELECTRICALLY BIASED SHELL

FIELD OF THE INVENTION

This invention relates to an electric fuel pump submersible in a fuel within an automotive fuel tank. More particularly, this invention relates to such fuel pump comprising an electric motor that includes a carbon brush electrode and further includes a metallic shell to which a negative electrical potential is applied during operation to inhibit reactions between the carbon brush electrode and the fuel.

BACKGROUND OF THE INVENTION

In an automotive vehicle, it is common practice to locate a fuel pump within a fuel tank. The fuel pump comprises a direct current electric motor having carbon brushes that contact a commutator and are connected to positive and negative terminals of an external power supply. The electric motor is contained with a housing that includes a metallic shell in contact with the fuel.

It has been proposed to utilize an automotive fuel that contains a high concentration of ethanol up to about 85%. During operation, the ethanol tends to become ionized. The ions may react with electrical components within the electric motor of the fuel pump. In particular, positive ions derived from the ethanol may react with metallic agents added to the negative carbon brush to form a resistive film that inhibits current flow between the brush and commutator, thereby reducing the operational life of the motor.

Therefore, there is a need for a fuel pump that inhibits reaction between components of the electric motor, particularly a negative carbon brush, and ions within the fuel and so extends the useful life of an electric fuel pump, particularly when used with high alcohol fuel.

BRIEF SUMMARY OF THE INVENTION

This invention provides a fuel pump that is submersible within a fuel, for example, within a fuel tank of an automotive vehicle. The fuel pump comprises an electric motor that includes a commutator and a negative brush electrode connected to a negative terminal of an external power supply. The fuel pump also includes a metal shell in contact with the fuel. In accordance with this invention, the metal shell is also connected to the negative terminal of the external power supply. During operation, a negative electrical potential is applied to the metal shell to preferentially react with ions within the fuel. In this manner, the metal shell serves as an anode to reduce the concentration of ionic species in the fuel and decrease reactions with the brush electrode, thereby extending the useful life of the fuel pump.

BRIEF DESCRIPTION OF THE DRAWINGS

The present invention will be further illustrated with reference to the accompanying drawings wherein:

The FIGURE is a portion of an automotive fuel pump having a negative brush assembly end a negatively biased metallic shell in accordance with this invention.

DETAILED DESCRIPTION OF THE INVENTION

In accordance with a preferred embodiment of this invention, referring to the FIGURE there is depicted a portion of an automotive fuel pump adapted for use with a high ethanol fuel. In use, pump 10 is located within a fuel tank of an automotive vehicle, submerged within fuel therein. The fuel pump comprises a direct current electric motor, as discussed herein, and a pumping element (not shown). During operation, the electric motor is connected to an external power supply through wires and drives the pumping element to pump fuel through a fuel line that leads to the engine. Automotive fuel pumps of the type described are commercially available and may be readily modified in accordance with this invention. By way of a preferred example, this embodiment disdoses improvements to a fuel pump commercially available from Visteon Corporation under the trade designation Model No. VP4L2U-9350-AB.

Fuel pump 10 comprises a generally cylindrical metallic shell 12 that defines a cavity 18 that contains elements of the electric motor and pumping elements. Shell 12 is generally cylindrical about axis 15 and is preferably formed of a low carbon steel designated ASM1010. An outlet housing 14 is mounted at one end of shell 12 and secured by rolled edge 16. Outlet housing 14 is preferably formed of an electrically insulative polymeric material. The electric motor includes an armature 20 coaxial within shell 12 and having an end received within a bearing 22 in the outlet housing 14. A commutator 24 for the electric motor is mounted about armature 20. Electric current is delivered to commutator 24 by a pair of brush electrode assemblies, of which negative brush electrode assembly 26 is depicted in the FIGURE. Brush assembly 26 includes a solid carbon brush electrode 28 having an end surface 30 in sliding contact with commutator 24. Brush electrode 28 is slideably received in a sleeve 32 mounted in outlet housing 14. A spring 34 within sleeve 32 urges brush electrode 28 against commutator 24. A metallic post 36 is affixed to sleeve 32 opposite brush electrode 28 and is connected to brush electrode 28 by a metallic strip 38. An annular connector 40 is press fit about post 36 and is connected to a negative terminal of the pump (not shown). A polymeric cover 41 protects terminal 36 from contact with fuel. During operation, the pump terminal is connected to wires that lead to a negative terminal of an external power source. A negative electrical potential is applied through connector 40, post 36, strip 38 to carbon brush electrode 28, and, through carbon brush electrode 28 to commutator 24 for operating the electric motor.

When installed within the fuel tank, the outer surface of shell 12 is in contact with the fuel. In addition, fuel is pumped through cavity 18 to the fuel outlet of the pump (not shown). As fuel flows through cavity 18, carbon brush electrode 28 is in contact with the fuel. Under these conditions, ions within the fuel tend to react with carbon brush electrode 28. In particular, for fuel having a high alcohol content, positive ions derived from the alcohol tend to react with metallic constituents of the carbon brush electrode 28 to form a resistive film that may build up on end surface 30 and inhibit the desired electrical contact with commutator 24.

In accordance with the preferred embodiment, an electrical connector 50 is provided to connect shell 12 and post 36 of brush assembly 26. Connector 50 comprises a metallic strip embedded with outlet housing 14 and includes an annular end 52 fitted about post 36. Connector 50 comprises an end 54 opposite connector 52. End 54 is disposed in a slot 58 in the outer surface of housing 14 and is received in a notch in rolled edge 16. End 54 is urged against shell 12 by a spring loop 56 that is flexibly deformed during edge rolling to secure housing 14 in shell 12.

During operation, the pump terminals are connected to an electrical power supply and apply a negative electrical potential to post 36 and thus through strip 38 to carbon brush electrode 28. A negative potential is also applied through connector 50 to shell 12. The outer surface of shell 12 is in contact with fuel within the fuel tank surrounding the pump. Also, the inner surface of shell 12 is in contact with fuel pumped through cavity 18. Positive ions within the fuel react with shell 12 at the inner and outer surfaces. Thus, the shell serves as a anode to preferentially react with ions within the fuel, thereby diluting the concentration of ions. As a result, reactions at carbon brush electrode 28 are decreased. This inhibits the build-up of resistive deposit on brush electrode 28 and thereby extends the useful life of the fuel pump.

In another aspect of this invention, the useful life of the fuel pump in high alcohol fuels is further enhanced by using a brush electrode 28 that is composed of carbon material that is substantially free of molybdenum, iron, aluminum or other metallic constituents that tend to react with ionic ethanol. Preferably, the content of any one metal is limited to a concentration not greater than 600 ppm.

Therefore, this invention provides a fuel pump that is particularly suited for use in high ethanol fuels. The invention takes advantage of a steel shell already found in commercially available fuel pumps and may be practiced with only minor modification to the design of such fuel pumps. The invention substantially extends the useful life of the fuel pump by limiting reactions that tend to occur at the negative carbon brush.

While this invention has been described in terms of certain embodiments thereof, it is not intended to be so limited, but rather only to the extent set forth in the claims that follow.

What is claimed is:

1. A fuel pump submersible within a fuel inside a fuel tank, the fuel pump comprising:
   an outer housing defined in part by a metal shell adapted for contact with the fuel, the outer surface of the metal shell contacting fuel in the fuel tank, the inner surface of the metal shell contacting fuel in the fuel pump;
   an electric motor comprising a commutator and a negative brush electrode adapted for connection to a negative terminal of an external power supply; and
   means for connecting the metal shell to the negative terminal to apply a negative electrical potential to said metal shell effective to preferentially react with ions within the fuel located in the fuel tank and in the fuel pump to reduce the concentration of ionic species in the fuel and decrease reactions with the negative brush.

2. A fuel pump in accordance with claim 1 wherein the brush electrode is composed of high purity carbon material.

3. A fuel pump in accordance with claim 2 wherein the high purity carbon material does not contain a metal element in an amount greater than 600 ppm.

4. A fuel pump in accordance with claim 2 wherein the metal shell is formed of steel.

5. A fuel pump in accordance with claim 2 wherein the metal shell defines an internal cavity for pumping fuel through the fuel pump.

6. A fuel pump submersible in a high alcohol fuel within a fuel tank of an automotive vehicle and comprising:
   a metal shell adapted for contact with said high alcohol fuel;
   an outlet housing closing off one end of the metal shell, the outlet housing constructed of a non-conductive material;
   an electric motor at least partially disposed within the metal shell, said electric motor including a commutator and a negative electrode assembly comprising a carbon brush electrode slideably contacting the commutator, said carbon brush electrode being formed of substantially metal-free carbon material and connected to a negative terminal of an external power supply, the negative electrode assembly extending through the outlet housing; and
   an electrically conductive pathway formed within the outlet housing for electrically connecting the metal shell to the negative electrode assembly for applying a negative electrical potential to the metal shell effective to reduce ions within the high alcohol fuel.

7. A fuel pump in accordance with claim 6 wherein a metallic connector connecting the negative electrode assembly to the metal shell.

8. A fuel pump in accordance with claim 6 wherein said carbon brush is composed of a high purity carbon metal containing no metal in an amount greater than 600 ppm.

9. A fuel pump in accordance with claim 7, wherein the metal connector is embedded in the outlet housing.

10. A fuel pump in accordance with claim 9, wherein the metal connector has a first end contacting the metal shell, the first end defining a spring loop.

11. A fuel pump in accordance with claim 10, wherein the outlet housing defines a slot receiving the spring loop of the first end.

12. A fuel pump in accordance with claim 10, wherein an edge of the metal shell engages the outlet housing, the spring loop at the first end of the metal connector being deformed by the edge of the metal shell.

13. A fuel pump in accordance with claim 12 wherein the edge of the metal shell is a rolled edge that engages the outlet housing.

14. A fuel pump in accordance with claim 9, wherein the metal connector has a second end contacting the negative electrode assembly, the second end having on annular shape extending around the periphery of the negative electrode assembly.

15. A fuel pump in accordance with claim 6, wherein the outer surface of the metal shell contacts fuel within the fuel tank, and wherein the inner surface of the metal shell contacts fuel with an internal cavity defined by the metal shell.

16. A fuel pump in accordance with claim 1, wherein the outer housing is further defined by an outlet housing closing off an end of the metal shell, the outlet housing being formed of a non-conductive material.

17. A fuel pump in accordance with claim 16, wherein the means for connecting includes a metal strip embedded within the outlet housing.

18. A fuel pump in accordance with claim 17, wherein the metal shell is connected to the outlet housing by rolling an edge of the metal shell, and wherein the metal strip has a first end defining a spring loop, the spring loop being deformed by the rolled edge of the metal shell.

19. A fuel pump in accordance with claim 18, wherein the outlet housing defines a slot receiving the spring loop of the first end.

20. A fuel pump in accordance with claim 19, wherein the metal strip has a second end contacting the negative electrode assembly, the second end having an annular shape extending around the periphery of the negative electrode assembly.

21. A fuel pump in accordance with claim 1, wherein the metal shell is connected in series to the negative terminal.

* * * * *

UNITED STATES PATENT AND TRADEMARK OFFICE
CERTIFICATE OF CORRECTION

PATENT NO. : 6,890,160 B2  Page 1 of 1
DATED : May 10, 2005
INVENTOR(S) : Dave Dokas It is certified that error appears in the above-identified patent and that said Letters Patent is hereby corrected as shown below:

<u>Column 4,</u>
Line 45, after "housing" delete "dosing" and insert -- closing --.

Signed and Sealed this

Eleventh Day of April, 2006

JON W. DUDAS
*Director of the United States Patent and Trademark Office*